(12) United States Patent
Chen et al.

(10) Patent No.: US 12,539,486 B2
(45) Date of Patent: Feb. 3, 2026

(54) EFFICIENT AND LOW-ENERGY SHIP $CO_2$ CAPTURE-MEMBRANE DESORPTION-MINERALIZATION FIXATION SYSTEM AND METHOD

(71) Applicant: China University of Mining and Technology, Xuzhou (CN)

(72) Inventors: Siming Chen, Qingdao (CN); Xilin She, Qingdao (CN); Lei Zhang, Qingdao (CN); Hua Tang, Qingdao (CN); Chunjin Zhang, Qingdao (CN); Jingchao Liu, Qingdao (CN)

(73) Assignee: China University of Mining and Technology, Xuzhou (CN)

( * ) Notice: Subject to any disclaimer, the term of this patent is extended or adjusted under 35 U.S.C. 154(b) by 325 days.

(21) Appl. No.: 18/233,360

(22) Filed: Aug. 14, 2023

(65) Prior Publication Data

US 2024/0050889 A1  Feb. 15, 2024

(30) Foreign Application Priority Data

Aug. 12, 2022  (CN) .......................... 202210966028.5

(51) Int. Cl.
*B01D 53/22* (2006.01)
*B01D 53/14* (2006.01)
*B01D 69/02* (2006.01)

(52) U.S. Cl.
CPC ..... *B01D 53/1425* (2013.01); *B01D 53/1475* (2013.01); *B01D 69/02* (2013.01);
(Continued)

(58) Field of Classification Search
CPC ............ B01D 53/1425; B01D 53/1475; B01D 69/02; B01D 2325/0283; B01D 2257/504;
(Continued)

(56) References Cited

U.S. PATENT DOCUMENTS 7,938,889 B2 * 5/2011 Iijima .................... B01D 61/14
95/193
11,383,199 B1 * 7/2022 Kolodji ................ B01D 53/229
(Continued)

FOREIGN PATENT DOCUMENTS

CN      111298616 A    6/2020
CN      113332831 A    9/2021
(Continued)

OTHER PUBLICATIONS

Li Xiaoming, et al., Experimental study on seawater absorbing CO2 using hollow fiber membrane, Membrane Science and Technology, 2012, pp. 92-96, vol. 32 No. 1.

*Primary Examiner* — Anthony R Shumate
(74) *Attorney, Agent, or Firm* — Thomas Horstemeyer, LLP

(57) ABSTRACT

An efficient and low-energy ship $CO_2$ capture-membrane desorption-mineralization fixation system, comprising a cooler, a fan, an absorption tower, a $CO_2$-rich solution pump, a plurality of hollow fiber membrane contactors, and a $CO_2$-lean solution pump, which are connected one by one to form a queue. The beginning of the queue is connected to a marine diesel engine, and the end of the queue is connected to the absorption power again. The hollow fiber membrane contactors are arranged in parallel. The present invention uses a $CO_2$ mineralization fixation by seawater as the driving force for the regeneration of $CO_2$ from the $CO_2$-rich solution. This system and method can solve the problems existing in the existing ship CCUS technology with zero $CO_2$ regeneration energy consumption, and easier and safer $CO_2$ storage in the ocean.

10 Claims, 4 Drawing Sheets

(52) U.S. Cl.
CPC .................. *B01D 2257/504* (2013.01); *B01D 2258/012* (2013.01); *B01D 2325/0283* (2022.08); *B01D 2325/04* (2013.01); *B01D 2325/38* (2013.01)

(58) Field of Classification Search
CPC .......... B01D 2258/012; B01D 2325/04; B01D 2325/38
See application file for complete search history.

(56) References Cited

U.S. PATENT DOCUMENTS

| | | | |
|---|---|---|---|
| 2008/0210092 A1 | 9/2008 | Buckles et al. | |
| 2009/0294366 A1 | 12/2009 | Wright et al. | |
| 2012/0055385 A1* | 3/2012 | Lien | B01D 53/226 95/47 |
| 2013/0266380 A1* | 10/2013 | Capron | C12M 23/14 405/184.4 |
| 2015/0231561 A1 | 8/2015 | Reardon et al. | |
| 2015/0246313 A1* | 9/2015 | Ogawa | B01D 53/1475 423/220 |
| 2018/0078892 A1* | 3/2018 | Lee | B01D 53/1425 |
| 2021/0053012 A1 | 2/2021 | Chang et al. | |
| 2023/0033705 A1* | 2/2023 | Gao | B01D 53/62 |
| 2023/0130504 A1* | 4/2023 | Voice | B01D 53/1418 60/274 |
| 2023/0147264 A1* | 5/2023 | Rinne | C25B 9/60 205/468 |
| 2023/0372864 A1* | 11/2023 | Nam | B01D 53/343 |
| 2024/0162456 A1* | 5/2024 | Hall | H01M 8/04014 |
| 2025/0084541 A1* | 3/2025 | Matsumoto | C25B 13/02 |
| 2025/0154082 A1* | 5/2025 | Henson | B01D 53/268 |

FOREIGN PATENT DOCUMENTS

| | | |
|---|---|---|
| CN | 113828120 A | 12/2021 |
| JP | 2019089675 A | 6/2019 |
| WO | 2022092427 A1 | 5/2022 |

\* cited by examiner

EFFICIENT AND LOW-ENERGY SHIP $CO_2$ CAPTURE-MEMBRANE DESORPTION-MINERALIZATION FIXATION SYSTEM AND METHOD

CROSS REFERENCE TO THE RELATED APPLICATIONS

This application is based upon and claims priority to Chinese Patent Application No. 202210966028.5, filed on Aug. 12, 2022, the entire contents of which are incorporated herein by reference.

TECHNICAL FIELD

The present invention relates to the field of tail gas treatment technology, in particular to an efficient and low-energy ship $CO_2$ capture-membrane desorption-mineralization fixation system and method.

BACKGROUND

Dredging ship is an important engineering ship, which plays an irreplaceable role in port, channel dredging, lake expansion, mud filling and land reclamation, sand blowing and island filling. Different from traditional operating ships, such ships have high installed power and large exhaust gas emissions. With the introduction of international conventions and related planning documents regulating ship greenhouse gas emissions, reducing carbon dioxide ($CO_2$) emissions from ship exhaust gas has become an important factor to be considered when countries develop green dredging ships. At present, most ocean-going ships will continue to use traditional fuels in the short term, in this case, $CO_2$ capture, utilization and storage (CCUS) technology may become an alternative to ship $CO_2$ emission reduction. In recent years, countries around the world have carried out extensive research on CCUS technology. This technology has become the main solution for large $CO_2$ emitters such as electricity, cement and steel on land, which also provides an important reference for the application of CCUS technology on ships.

However, at present, in the world, the ship CCUS technology faces the following problems:
(1) it is difficult to install and transform the CCUS system on the ship. The ship space is relatively cramped, especially in the ship engine room, there is not much space to install the CCUS system. Taking the mature post-combustion $CO_2$ capture system using alkanolamine absorbent as an example, its working process includes $CO_2$ absorption, regeneration and cooling. If the existing ship exhaust gas treatment device is to be reformed, it is necessary to install absorption tower, regeneration tower, cooler, pump and other devices. Due to the limitation of ship space, it is difficult to realize. In addition, the storage of $CO_2$ requires the installation of high-power $CO_2$ compressors and condensers for high-pressure gas or liquid storage, which will occupy a large ship space.
(2) higher ship $CO_2$ capture and storage costs increase the burden on shipowners. First of all, the installation of ship CCUS system requires a high initial cost, and the operation of the system increases the energy consumption and operation cost of the ship.

The main reasons for the high cost of ship $CO_2$ capture and storage are as follows.

① $CO_2$ concentration in the ship exhaust gas is low, and the regeneration energy consumption of the absorbent is high and the loss is large.
② The engine efficiency and ship power will be affected by the integrated $CO_2$ capture process.
③ The ship space sacrificed by $CO_2$ storage will lead to a decrease in cargo transport capacity.
④ Compared with onshore storage and oil displacement, offshore storage and oil displacement are more difficult and the investment cost is higher.

In addition, the current cost of $CO_2$ capture and storage of ships is much higher than the $CO_2$ price of the carbon trading market. The enthusiasm of ships to apply CCUS technology is not high, and forced installation will impose a great burden on ship owners.

(3) The safety of $CO_2$ ship storage and transportation is worthy of attention. The $CO_2$ captured by the ship needs to be temporarily stored and transported on the ship for a certain distance, and there are certain safety hazards in the storage and transportation of $CO_2$, whether gaseous or liquid. Once the liquid stored $CO_2$ leaks, the cryogenic gas may cause damage to the hull structure or personnel. On the contrary, if the liquid tank encounters high temperature, gasification will increase the internal pressure of the container, and there is a risk of leakage or even explosion. $CO_2$ is a colorless and odorless gas at room temperature. Excessive inhalation of $CO_2$ will cause harm to the human body and even have the risk of suffocation. Besides, liquid $CO_2$ storage and transportation will have some impact on the stability of the ship, which should also be given full attention.

SUMMARY

The purpose of the present invention is to provide an efficient and low-energy ship $CO_2$ capture-membrane desorption-mineralization fixation system and method to solve the problems existing in the existing ship CCUS technology. Storing $CO_2$ in the ocean in the form of carbonate makes storage easier and safer, and saves space.

To achieve the above purpose, the present invention provides an efficient and low-energy ship $CO_2$ capture-membrane desorption-mineralization fixation system, comprising a cooler, a fan, an absorption tower, a $CO_2$-rich solution pump and a plurality of hollow fiber membrane contactors, wherein the cooler, the fan, the absorption tower, the $CO_2$-rich solution pump and the plurality of hollow fiber membrane contactors are connected to a marine diesel engine, the plurality of hollow fiber membrane contactors are set in parallel, the plurality of hollow fiber membrane contactors are connected to the $CO_2$-lean solution pump, an outlet end of the $CO_2$-lean solution pump is connected to an inlet end of the absorption tower, and an outlet end of the absorption tower is connected to an inlet end of the $CO_2$-rich solution pump, an outlet end of the $CO_2$-rich solution pump is connected to inlet ends of the plurality of hollow fiber membrane contactors, an outlet end of the cooler is connected to an inlet end of the fan, and an outlet end of the fan is connected to the inlet end of the absorption tower.

Preferably, an inlet is set on a top of the absorption tower, an exhaust port is set on a top side of the absorption tower, and a liquid outlet is set on a bottom of the absorption tower, wherein the liquid outlet is connected to the $CO_2$-rich solution pump.

Preferably, a gas inlet is set on a bottom side of the absorption tower, wherein the gas inlet is connected to the fan.

Preferably, a total $CO_2$-rich solution valve is arranged between the $CO_2$-rich solution pump and the plurality of hollow fiber membrane contactors, a total $CO_2$-lean solution valve is arranged between the plurality of hollow fiber membrane contactors and the $CO_2$-lean solution pump, a $CO_2$-rich solution flows into tube sides of the plurality of hollow fiber membrane contactors at a same time through the total $CO_2$-rich solution valve, and a $CO_2$-lean solution from the tube sides flows through the total $CO_2$-lean solution valve.

Preferably, each of the plurality of hollow fiber membrane contactors comprises membrane elements and shell heads, wherein the shell heads are arranged at both ends of the membrane elements, and both ends of the membrane elements are open structures.

Preferably, the membrane elements are immersed in seawater, and the shell heads are arranged above the seawater level.

Preferably, a membrane material of each of the membrane elements is hydrophobic material, and each of the membrane elements has an inner diameter of 320-350 μm, an outer diameter of 0.4-2 mm and a wall thickness of 0.02-0.08 mm; and a size of a pore of each of the membranes is 0.02-0.2 μm, and a porosity is >40%.

An efficient and low-energy ship $CO_2$ capture-membrane desorption-mineralization fixation method, comprising the following steps:
  S1: collecting an exhaust gas in an exhaust pipe of the marine diesel engine and cooling the exhaust gas to obtain a cooled exhaust gas;
  S2: introducing the cooled exhaust gas into the absorption tower, and using an efficient $CO_2$ absorbent to capture a ship $CO_2$ in the absorption tower with countercurrent contact, wherein the treated exhaust gas is discharged from a top of the absorption tower, and a solution obtained on a bottom of the absorption tower is the $CO_2$-rich solution after $CO_2$ absorption process;
  S3: pumping the $CO_2$-rich solution into the tube sides of the membrane elements of the plurality of hollow fiber membrane contactors with fixed liquid flow rate, wherein the $CO_2$-rich solution flowing through the membrane tubes becomes the $CO_2$-lean solution, wherein the $CO_2$-lean solution is pumped into the absorption tower through the $CO_2$-lean solution pump for secondary absorption; and
  S4: during a flow process of the $CO_2$-rich solution in the tube sides of the membrane elements, allowing the dissolved $CO_2$ in the $CO_2$-rich solution to diffuse into seawater through the membrane elements, wherein regeneration of $CO_2$ from the $CO_2$-rich solution in the tube sides and mineralization of the regenerated $CO_2$ in the seawater are completed simultaneously Preferably, a liquid flow rate in step S3 is fixed ranging from 0.2 m/s-0.5 m/s.

Preferably, a rate of $CO_2$ diffusion from the $CO_2$-rich solution to the seawater through the membrane elements in step S4 is determined by a $CO_2$ concentration difference between the $CO_2$-rich solution and the seawater, and a driving force of a diffusion process is provided by a process of $CO_2$ mineralization fixation by the seawater.

Therefore, the present invention adopts an efficient and low-energy ship $CO_2$ capture-membrane desorption-mineralization fixation system and method with the above structure, which has the following beneficial effects:

(1) the present invention uses post-combustion capture technology to capture ship flue gas $CO_2$, which can be transformed on the existing exhaust gas treatment device, with small transformation of the ship system and less investment;

(2) the present invention adopts the process of $CO_2$ mineralization by seawater as the driving force for $CO_2$ regeneration in hollow fibre membrane contactors, rather than the traditional heating regeneration method in a stripping tower. The net energy consumption of $CO_2$ regeneration is zero, so no additional fuel consumption is required.

(3) the present invention uses more compact hollow fibre membrane contactors for $CO_2$ regeneration, the hollow fibre membranes are immersed in seawater and do not occupy the area on the ship, so that more goods can be loaded.

(4) $CO_2$ is stored in the form of carbonate in the ocean, rather than in the form of gas or liquid on the ship, therefore no $CO_2$ compressor and condenser are needed, and the invention is easier, safer and more space-saving.

(5) $CO_2$ diffuses from $CO_2$-rich solution to seawater in a dissolved state through the membranes, which can avoid the loss of $CO_2$ in a gaseous state to the atmosphere. At the same time, the indirect contact between the absorbent and seawater can avoid mutual pollution.

The following is a further detailed description of the technical scheme of the invention through drawings and implementation examples.

DETAILED DESCRIPTION OF THE EMBODIMENTS

Figure 1:
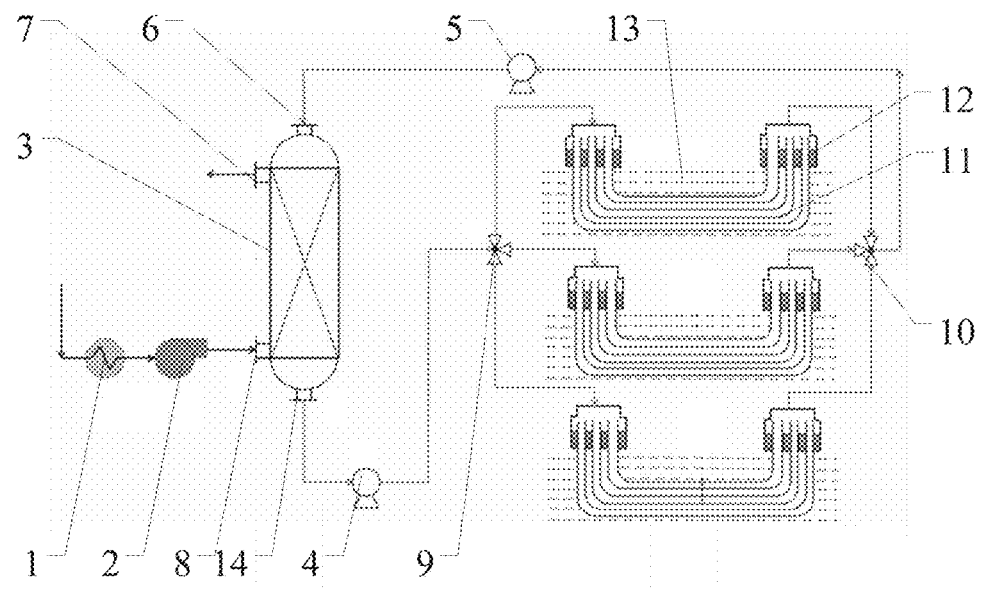
FIG. 1 is a system device diagram of the implementation example of an efficient and low-energy ship $CO_2$ capture-membrane desorption-mineralization fixation system and method.

The present invention provides an efficient and low-energy ship $CO_2$ capture-membrane desorption-mineralization fixation system, comprising a cooler 1, a fan 2, an absorption tower 3, a $CO_2$-rich solution pump 4 and a plurality of hollow fiber membrane contactors, wherein the cooler, the fan, the absorption tower, the $CO_2$-rich solution pump and the plurality of hollow fiber membrane contactors are connected to a marine diesel engine, the plurality of hollow fiber membrane contactors are set in parallel, the plurality of hollow fiber membrane contactors are connected to the $CO_2$-lean solution pump 5, an outlet end of the $CO_2$-lean solution pump 5 is connected to an inlet end of the absorption tower 3, and an outlet end of the absorption tower 3 is connected to an inlet end of the $CO_2$-rich solution pump 4, an outlet end of the $CO_2$-rich solution pump 4 is connected to inlet ends of the plurality of hollow fiber membrane contactors, an outlet end of the cooler 1 is connected to an inlet end of the fan 2, and an outlet end of the fan 2 is connected to the inlet end of the absorption tower 3. An inlet 6 is set on a top of the absorption tower 3, an exhaust port is set on a top side of the absorption tower. A gas inlet 8 is set on a bottom side of the absorption tower 3, wherein the gas inlet 8 is connected to the fan 2, and a liquid outlet 14 is set on a bottom of the absorption tower 3, wherein the liquid outlet 14 is connected to the $CO_2$-rich solution pump 4.

A total $CO_2$-rich solution valve 9 is arranged between the $CO_2$-rich solution pump 4 and the plurality of hollow fiber membrane contactors, a total $CO_2$-lean solution valve 10 is arranged between the plurality of hollow fiber membrane contactors and the $CO_2$-lean solution pump 5, a $CO_2$-rich solution flows into tube sides of the plurality of hollow fiber membrane contactors at a same time through the total $CO_2$-rich solution valve, and a $CO_2$-lean solution from the tube sides flows through the total $CO_2$-lean solution valve. Each of the plurality of hollow fiber membrane contactors comprises membrane elements 11 and shell heads 12, wherein the shell heads 12 are arranged at both ends of the membrane elements 11, and both ends of the membrane elements 11 are open structures. the membrane elements 11 are immersed in seawater 13, and the shell heads are arranged above the seawater level. A membrane material of each of the membrane elements 11 is hydrophobic material, and each of the membrane elements 11 has an inner diameter of 320-350 μm, an outer diameter of 0.4-2 mm and a wall thickness of 0.02-0.08 mm; and a size of a pore of each of the membranes is 0.02-0.2 μm, and a porosity is >40%.

A flue gas cooler, a blower, a first flue gas analyzer and a second flue gas analyzer are arranged between the marine diesel engine and the absorption tower. The access end of the flue gas cooler is connected to the exhaust pipe of the marine diesel engine, the outlet end of the flue gas cooler is connected to the access end of the blower, and the outlet end of the blower is connected to the input end of the first flue gas analyzer; the flue gas cooler, blower, the first flue gas analyzer and the absorption tower are connected through the pipeline; where the first flue gas analyzer is located on the side of the inlet of the absorption tower, and the second flue gas analyzer is located on the side of the exhaust port on the top of the absorption tower.

In one implementation, the absorption tower includes a demister, at least one spray pipe, and at least one spray pipe, the demister is located above at least one spray pipe and at least one spray pipe. At least one spray pipe is located at the upper part of at least one spray pipe.

An efficient and low-energy ship $CO_2$ capture-membrane desorption-mineralization fixation method, including the following steps:

S1: collecting an exhaust gas in an exhaust pipe of the marine diesel engine and cooling the exhaust gas to obtain a cooled exhaust gas;

S2: introducing the cooled exhaust gas into the absorption tower, and using an efficient $CO_2$ absorbent to capture a ship $CO_2$ in the absorption tower with countercurrent contact, wherein the treated exhaust gas is discharged from a top of the absorption tower, and a solution obtained on a bottom of the absorption tower is the $CO_2$-rich solution after $CO_2$ absorption process;

S3: pumping the $CO_2$-rich solution into the tube sides of the membrane elements of the plurality of hollow fiber membrane contactors with fixed liquid flow rate, wherein the $CO_2$-rich solution flowing through the membrane tubes becomes the $CO_2$-lean solution, wherein the $CO_2$-lean solution is pumped into the absorption tower through the $CO_2$-lean solution pump for secondary absorption; and S4: during a flow process of the $CO_2$-rich solution in the tube sides of the membrane elements, allowing the dissolved $CO_2$ in the $CO_2$-rich solution to diffuse into seawater through the membrane elements, wherein regeneration of $CO_2$ from the $CO_2$-rich solution in the tube sides and mineralization of the regenerated $CO_2$ in the seawater are completed simultaneously.

The $CO_2$ absorbent used in this method is any physical solution and chemical solution that can absorb $CO_2$, including but not limited to alkanolamine solution, inorganic base solution, amino acid salt, etc.

Ship flue gas $CO_2$ refers to the $CO_2$ emitted during the combustion of fuel, including but not limited to coal, oil, natural gas, etc.

$CO_2$-rich solution is collected at the bottom of the absorption tower after the countercurrent contact of $CO_2$ with the absorbents, the $CO_2$-rich solution can be saturated or unsaturated $CO_2$ loaded solutions.

Seawater is any artificial seawater and natural seawater, and the pH range is between 7 and 10.

The technical scheme of the present invention is further explained by the following drawings and examples.

EXAMPLE

The artificial seawater composition used in the following embodiments of the invention is determined according to ASTM D 1141-98 'Standard Practice for the Preparation of Substitute Ocean Water', and its composition is shown in Table 1.

TABLE 1

| Component | Concentration(g · L$^{-1}$) |
| --- | --- |
| NaCl | 24.530 |
| Na$_2$SO$_4$ | 4.090 |
| MgCl$_2$ | 5.200 |
| CaCl$_2$ | 1.160 |
| SrCl$_2$ | 0.025 |
| KCl | 0.695 |
| NaHCO$_3$ | 0.201 |
| KBr | 0.101 |
| H$_3$BO$_3$ | 0.027 |
| NaF | 0.003 |

$CO_2$ capture-membrane desorption-mineralization fixation method:

(1) FIG. 1 is the system device diagram of $CO_2$ capture, desorption, mineralization of ship $CO_2$. As shown in the diagram, the $CO_2$ emitted by the ship enters the cooler, and then enters the absorption tower from the inlet under the action of the fan, and the $CO_2$-rich solution is obtained at the bottom of the tower. The 2M potassium glycine solution is used as the $CO_2$ absorbent to absorb $CO_2$ to saturation at room temperature and atmospheric pressure. The $CO_2$ absorption capacity is 1.43 mol/L, and 100 ml of $CO_2$-rich solution is taken for regeneration. After absorption process, the solution became $CO_2$-rich solution, which is pumped from the bottom outlet of the absorption tower, and the remaining flue gas is discharged from the top outlet of the absorption tower. Opening the total rich solution valve and the total lean solution valve, so that the $CO_2$-rich solution enters the tube sides of the membrane elements at a constant speed to realize the regeneration of $CO_2$-rich solution and the mineralization of the regenerated $CO_2$ simultaneously. The $CO_2$-lean solution after the membrane flowing process is pumped into the absorption tower through the inlet of the lean solution pump to absorb the ship $CO_2$ again, and the whole process is repeated.

Figure 2:
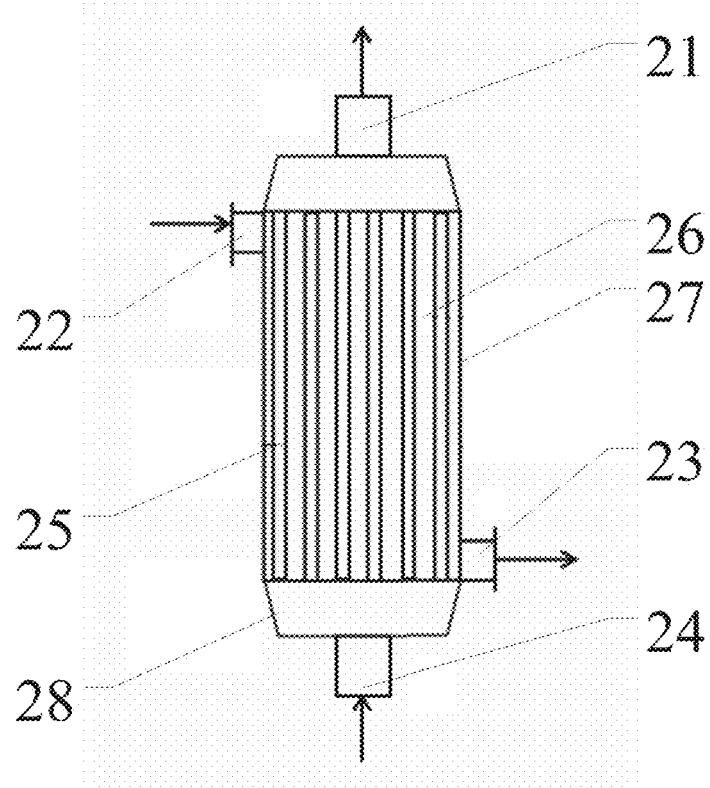
FIG. 2 is a traditional hollow fiber membrane contactor.

(2) The traditional hollow fiber membrane contactor (FIG. 2) is modified. FIG. 2 is the traditional hollow fiber membrane contactor. As shown in the figure, 21 is the outlet for gas, 22 is the inlet for solution, 23 is the outlet for solution, 24 is the inlet for gas, 25 is the tube of the hollow fiber membrane, 26 is the shell of the hollow fiber membrane, 27 is the membrane shell, 28 is the membrane shell head. Removing the membrane shell, retain both ends of the shell heads and the membrane elements, the shell heads and the membrane elements are poured and connected, and the two ends of the membrane elements are not sealed. The hollow fiber membrane material is hydrophobic PP material. The inner diameter of the hollow fiber membrane is 320-350 μm, the outer diameter is 400-450 μm, the wall thickness is 40-45 μm, the pore size of the membrane is 0.02-0.2 μm, and the porosity is 40%-50%. The membrane element is immersed in artificial seawater, and the shell heads are above the seawater level.

Figure 3:
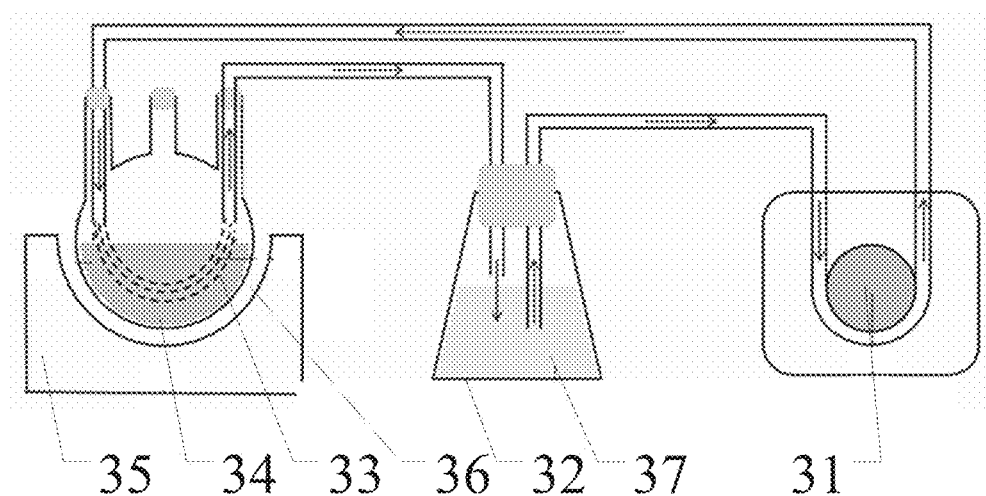
FIG. 3 is a laboratory-level device diagram of the present invention.
Figure 4:
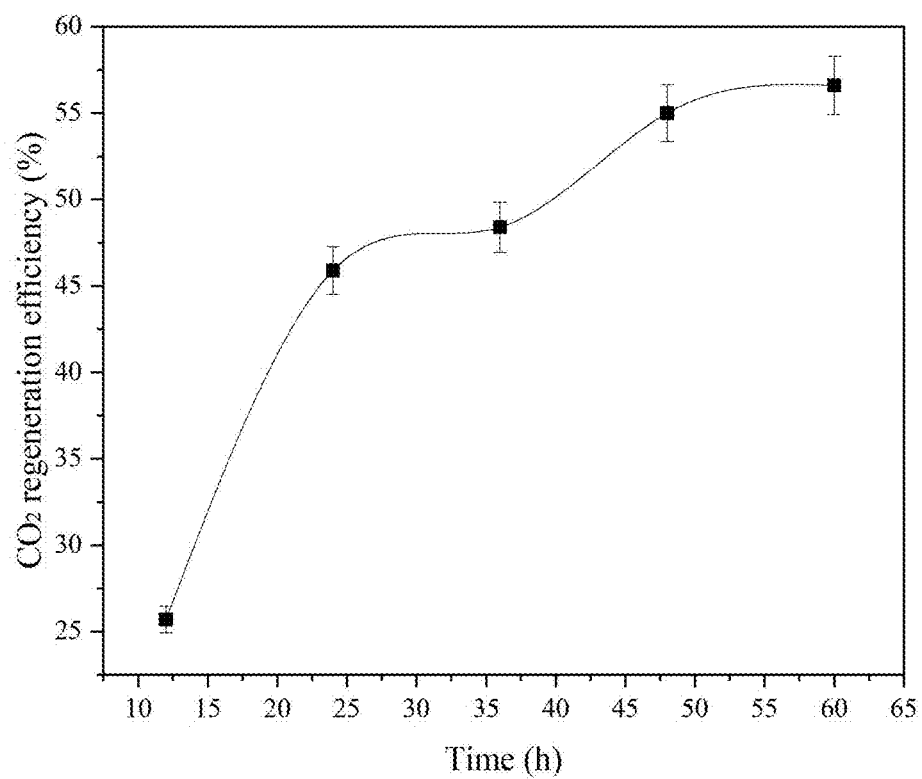
FIG. 4 shows a variation of $CO_2$ regeneration efficiency with time.
Figure 5:
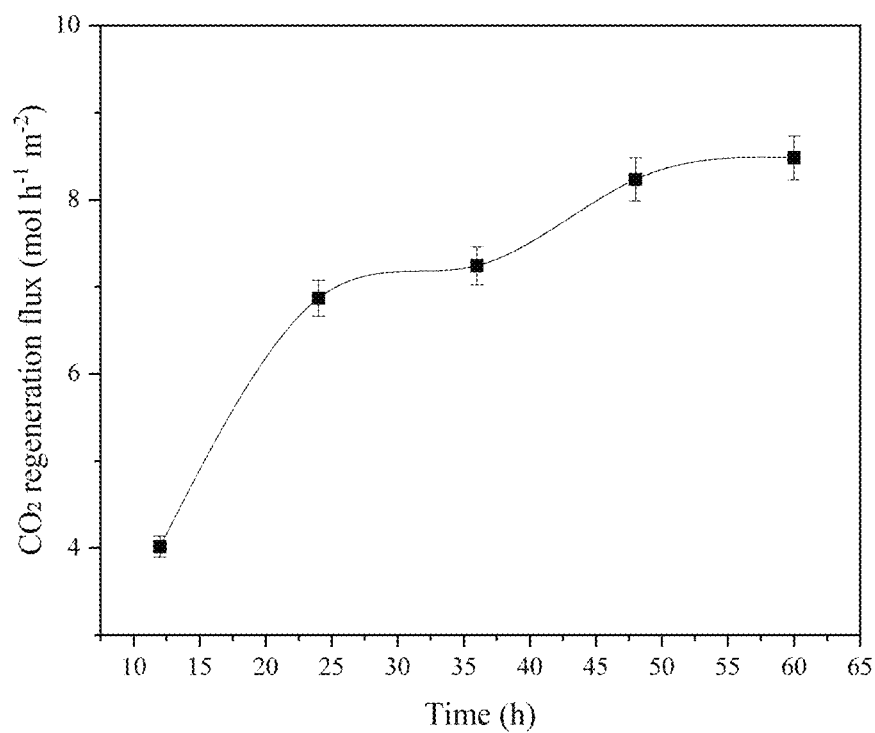
FIG. 5 shows a variation of $CO_2$ regeneration flux with time.
Figure 7:
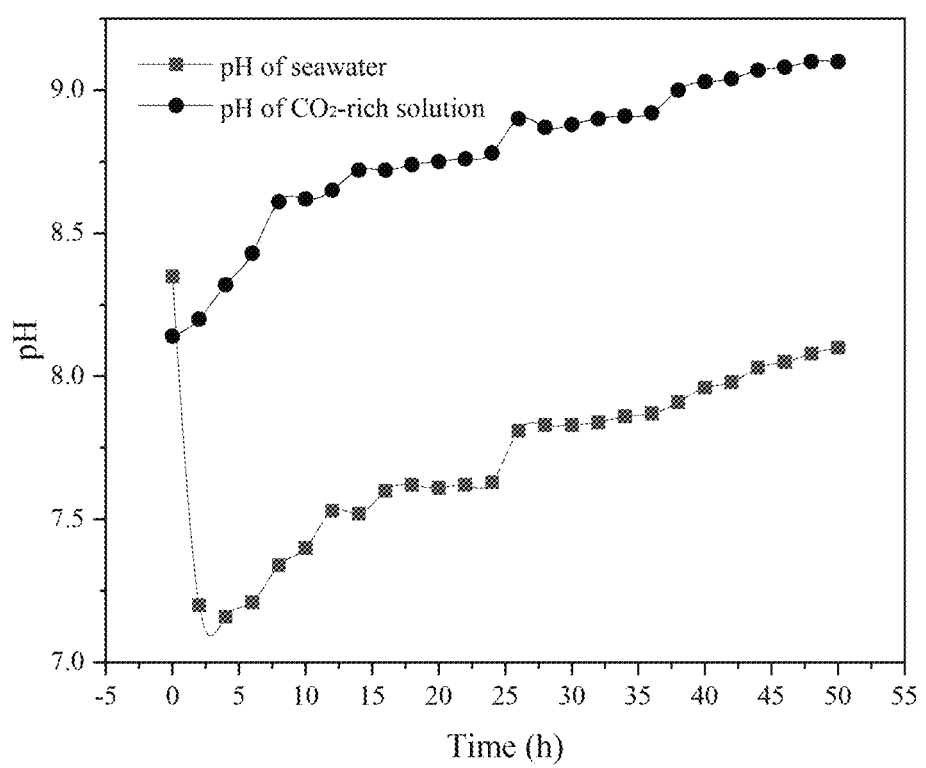
FIG. 7 shows variation curves of pH of seawater and $CO_2$-rich solution with time during regeneration.

(3) FIG. 3 is a laboratory-level $CO_2$ membrane desorption-mineralization fixation device diagram. As shown in the diagram, pumping 100 ml of rich solution 37 from one end of the conical flask 32 to one end of the membrane elements 33 at a flow rate of 0.5 ml/s by using a peristaltic pump 31 and enters the tube pass. Pump out at the other end of the tube pass, pump back to the conical flask 32 again, and cycle operation for 60 h. The hollow fiber membrane of the membrane element 33 was immersed in 800 ml artificial seawater 34. The ends of the membrane elements 33 were on the surface of the artificial seawater 34, and the artificial seawater 34 in the three-port flask 36 is stirred by the magnetic stirrer 35. The regeneration time is 60 h, and the artificial seawater was not replaced during the regeneration process. The pH changes of $CO_2$-rich solution and seawater were monitored in real time (as shown in FIG. 7). The $CO_2$ loading in $CO_2$-rich solution is titrated every 12 h to determine the $CO_2$ regeneration efficiency $\eta_{CO_2}$ (as shown in FIG. 4) and $CO_2$ regeneration rate $N_{CO_2}$, (as shown in FIG. 5), the calculation formula is as follows:

$$N_{CO_2} = (C_{L,i} - C_{L,o})Q_L$$

$$\eta(\%) = \left(1 - \frac{C_{L,o}}{C_{L,i}}\right)$$

where $A_i$ is the inner surface area of hollow fiber membrane; $C_{L,i}$ and $C_{L,o}$ are the concentration of $CO_2$ in the solution at the inlet and outlet of the assembly, respectively; $Q_L$ is the liquid flow rate controlled by the peristaltic pump.

FIG. 4 shows the variation of $CO_2$ regeneration efficiency with time. As shown in the figure, the $CO_2$ regeneration efficiency increases rapidly in the first 24 hours of the regeneration process, and the regeneration efficiency increases slowly with time from 24 hours to 60 hours. The regeneration efficiency is about 57% at 60 hours.

FIG. 5 shows the variation of $CO_2$ regeneration rate with time. As shown in the figure, the regeneration rate is represented by the $CO_2$ flux during the regeneration process. The $CO_2$ regeneration flux increases rapidly in the first 24 hours of the regeneration process, and the regeneration flux increases slowly with time from 24 hours to 60 hours, in units of $mol \cdot L^{-1} \cdot m^{-2}$.

Figure 6:
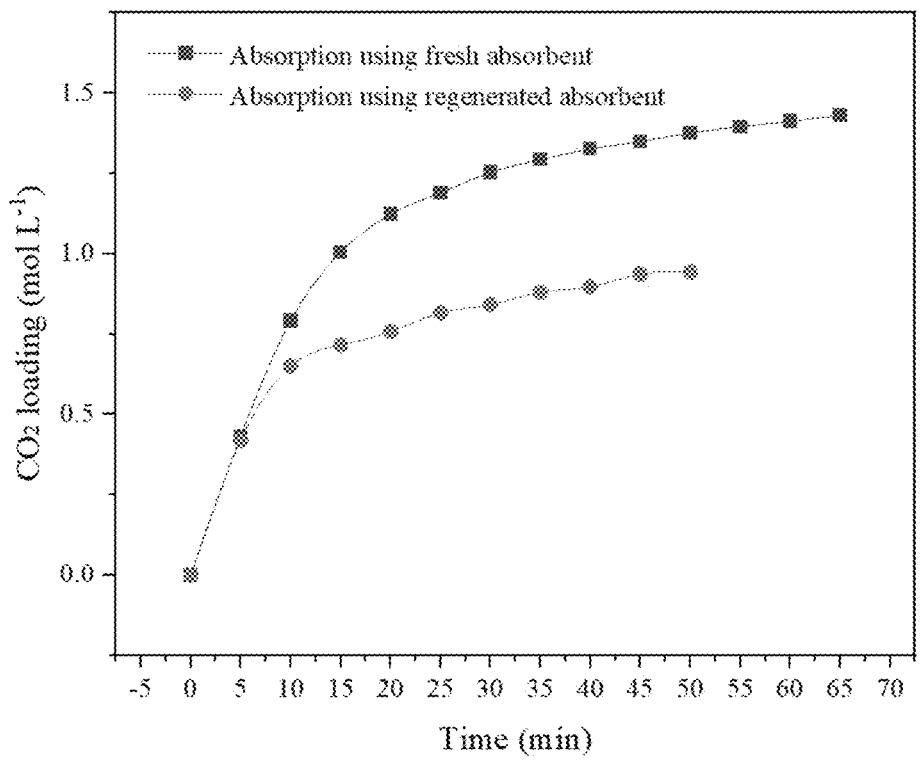
FIG. 6 is a comparison of $CO_2$ absorption performance between the regenerated solution and the fresh solution.

FIG. 6 shows the comparison between the secondary $CO_2$ absorption performance of the regenerated solution and the initial $CO_2$ absorption performance of the fresh solution. As shown in the figure, the original solution reached saturation after the first absorption of $CO_2$ 65 minutes, and the absorption amount was 1.43 mol/L. After regeneration, the solution absorbs $CO_2$ again and reaches saturation after 250 minutes, and the absorption amount is 0.943 mol/L.

FIG. 7 shows the variation of pH of seawater and $CO_2$-rich solution with time during regeneration. As shown in the figure, the pH of seawater began to decrease from 8.35, and decreased to the lowest value of 7.16 at the fourth hour, then began to rise slowly, and rose to 8.10 after 50 hours and tended to be stable. The pH of $CO_2$-rich solution gradually increased from 8.14 to 9.10 and tended to be stable. It shows that the $CO_2$ in the $CO_2$-rich solution is continuously reduced and diffuses into the seawater through the hollow fiber membrane.

(4) After the regeneration, the regenerated absorption solution is pumped into the absorption tower for secondary absorption to determine the cycle stability of the technology (as shown in FIG. 1).

Therefore, the present invention adopts an efficient and low-energy ship $CO_2$ capture-membrane desorption-mineralization fixation system and method with the above structure to solve the problems existing in the existing ship CCUS technology. $CO_2$ is stored in the ocean in the form of carbonate, which makes storage easier and safer, and saves space.

Finally, it should be noted that the above implementation examples are only used to explain the technical scheme of the invention rather than to restrict it. Although the invention is described in detail with reference to the better implementation examples, ordinary technicians in this field should understand that they can still modify or replace the technical scheme of the invention, and these modifications or equivalent replacements cannot make the modified technical scheme out of the spirit and scope of the technical scheme of the invention.

What is claimed is:

1. An efficient and low-energy ship $CO_2$ capture-membrane desorption-mineralization fixation system, comprising a cooler, a fan, an absorption tower, a $CO_2$-rich solution pump and a plurality of hollow fiber membrane contactors, wherein the cooler, the fan, the absorption tower, the $CO_2$-rich solution pump and the plurality of hollow fiber membrane contactors are connected to a marine diesel engine, the plurality of hollow fiber membrane contactors are set in parallel, the plurality of hollow fiber membrane contactors are connected to a $CO_2$-lean solution pump, an outlet end of the $CO_2$-lean solution pump is connected to an inlet end of the absorption tower, and an outlet end of the absorption tower is connected to an inlet end of the $CO_2$-rich solution pump, an outlet end of the $CO_2$-rich solution pump is connected to inlet ends of the plurality of hollow fiber membrane contactors, an outlet end of the cooler is connected to an inlet end of the fan, and an outlet end of the fan is connected to the inlet end of the absorption tower;

a total $CO_2$-rich solution valve is arranged between the $CO_2$-rich solution pump and the plurality of hollow fiber membrane contactors, a total $CO_2$-lean solution valve is arranged between the plurality of hollow fiber membrane contactors and the $CO_2$-lean solution pump, a $CO_2$-rich solution flows into tube sides of the plurality of hollow fiber membrane contactors at a same time through the total $CO_2$-rich solution valve, and a $CO_2$-lean solution from the tube sides flows through the total $CO_2$-lean solution valve;

each of the plurality of hollow fiber membrane contactors comprises membrane elements and shell heads, wherein the shell heads are arranged at both ends of the membrane elements, and both ends of the membrane elements are open structures; and the membrane elements are immersed in seawater, and the shell heads are arranged above the seawater level.

2. The efficient and low-energy ship $CO_2$ capture-membrane desorption-mineralization fixation system according to claim 1, wherein an inlet is set on a top of the absorption tower, an exhaust port is set on a top side of the absorption tower, and a liquid outlet is set on a bottom of the absorption tower, wherein the liquid outlet is connected to the $CO_2$-rich solution pump.

3. The efficient and low-energy ship $CO_2$ capture-membrane desorption-mineralization fixation system according to claim 1, wherein a gas inlet is set on a bottom side of the absorption tower, wherein the gas inlet is connected to the fan.

4. The efficient and low-energy ship $CO_2$ capture-membrane desorption-mineralization fixation system according to claim 1, wherein a membrane material of each of the membrane elements is hydrophobic material, and each of the membrane elements has an inner diameter of 320-350 μm, an outer diameter of 0.4-2 mm and a wall thickness of 0.02-0.08 mm; and a size of a pore of each of the membranes is 0.02-0.2 μm, and a porosity is >40%.

5. An efficient and low-energy ship $CO_2$ capture-membrane desorption-mineralization fixation method, using the efficient and low-energy ship $CO_2$ capture-membrane desorption-mineralization fixation system according to claim 1, comprising the following steps:

S1: collecting an exhaust gas in an exhaust pipe of the marine diesel engine and cooling the exhaust gas to obtain a cooled exhaust gas;

S2: introducing the cooled exhaust gas into the absorption tower, and using an efficient $CO_2$ absorbent to capture a ship $CO_2$ in the absorption tower with countercurrent contact, wherein a treated exhaust gas is discharged from a top of the absorption tower, and a solution obtained on a bottom of the absorption tower is the $CO_2$-rich solution after $CO_2$ absorption process;

S3: pumping the $CO_2$-rich solution into the tube sides of the membrane elements of the plurality of hollow fiber membrane contactors with fixed liquid flow rate, wherein the $CO_2$-rich solution flowing through the membrane tubes becomes the $CO_2$-lean solution, wherein the $CO_2$-lean solution is pumped into the absorption tower through the $CO_2$-lean solution pump for secondary absorption; and S4: during a flow process of the $CO_2$-rich solution in the tube sides of the membrane elements, allowing the dissolved $CO_2$ in the $CO_2$-rich solution to diffuse into seawater through the membrane elements, wherein regeneration of $CO_2$ from the $CO_2$-rich solution in the tube sides and mineralization of the regenerated $CO_2$ in the seawater are completed simultaneously.

6. The efficient and low-energy ship $CO_2$ capture-membrane desorption-mineralization fixation method according to claim 5, wherein a liquid flow rate in step S3 is fixed ranging from 0.2 m/s-0.5 m/s.

7. The efficient and low-energy ship $CO_2$ capture-membrane desorption-mineralization fixation method according to claim 5, wherein a rate of $CO_2$ diffusion from the $CO_2$-rich solution to the seawater through the membrane elements in step S4 is determined by a $CO_2$ concentration difference between the $CO_2$-rich solution and the seawater, and a driving force of a diffusion process is provided by a process of $CO_2$ mineralization fixation by the seawater.

8. The efficient and low-energy ship $CO_2$ capture-membrane desorption-mineralization fixation method according to claim 5, wherein in the efficient and low-energy ship $CO_2$ capture-membrane desorption-mineralization fixation system, an inlet is set on a top of the absorption tower, an exhaust port is set on a top side of the absorption tower, and a liquid outlet is set on a bottom of the absorption tower, wherein the liquid outlet is connected to the $CO_2$-rich solution pump.

9. The efficient and low-energy ship $CO_2$ capture-membrane desorption-mineralization fixation method according to claim 5, wherein in the efficient and low-energy ship $CO_2$ capture-membrane desorption-mineralization fixation system, a gas inlet is set on a bottom side of the absorption tower, wherein the gas inlet is connected to the fan.

10. The efficient and low-energy ship $CO_2$ capture-membrane desorption-mineralization fixation method according to claim 5, wherein in the efficient and low-energy ship $CO_2$ capture-membrane desorption-mineralization fixation system, a membrane material of each of the membrane elements is hydrophobic material, and each of the membrane elements has an inner diameter of 320-350 μm, an outer diameter of 0.4-2 mm and a wall thickness of 0.02-0.08 mm; and a size of a pore of each of the membranes is 0.02-0.2 μm, and a porosity is >40%.

* * * * *